United States Patent
Trouille (12)

(10) Patent No.: US 6,458,409 B1
(45) Date of Patent: Oct. 1, 2002

(54) METHOD FOR PRODUCING AN EASILY DIGESTIBLE PROTEIN CONCENTRATE, A PROTEIN-RICH FOOD ITEM AND ITS USE

(76) Inventor: André Trouille, Am Bleeken 6a, D-29553 Bienenbuettel (DE)

( * ) Notice: Subject to any disclaimer, the term of this patent is extended or adjusted under 35 U.S.C. 154(b) by 0 days.

(21) Appl. No.: 09/555,190

(22) PCT Filed: Jan. 22, 1999

(86) PCT No.: PCT/EP99/00429

§ 371 (c)(1), (2), (4) Date: May 25, 2000

(87) PCT Pub. No.: WO99/37165

PCT Pub. Date: Jul. 29, 1999

(30) Foreign Application Priority Data

Jan. 24, 1998 (DE) .......................................... 198 02 675

(51) Int. Cl.[7] .............................. A23J 1/14; A23J 1/20; A23G 3/00
(52) U.S. Cl. ....................... 426/656; 426/634; 426/580; 426/658; 514/909; 514/866
(58) Field of Search ................................ 426/656, 634, 426/580, 658; 514/909, 866

(56) References Cited

U.S. PATENT DOCUMENTS

| | | | |
|---|---|---|---|
| 3,958,037 A | * | 5/1976 | Glabe et al. |
| 4,209,545 A | * | 6/1980 | Schapiro |
| 4,540,594 A | * | 9/1985 | Schanze |
| 5,494,694 A | * | 2/1996 | Herrmann |
| 6,171,604 B1 | * | 1/2001 | Mousa |

FOREIGN PATENT DOCUMENTS

| | | |
|---|---|---|
| DE | 22 28 705 A | 12/1972 |
| DE | 28 53 194 A | 6/1980 |
| DE | 30 49 380 A | 7/1982 |
| DE | 32 07 505 A | 9/1983 |

OTHER PUBLICATIONS

Database WPI Section Ch, Week 8125, Derwent Publications Ltd, London GB, AN 81–44692D XP002100908 & JP 56 023865 A, Mar. 6, 1981.

* cited by examiner

Primary Examiner—Anthony J. Weier
(74) Attorney, Agent, or Firm—Michael J. Striker

(57) ABSTRACT

The dietetic food concentrate is a pourable powder containing soy protein, honey and at least 50% by weight of albumin so that it is easily digestible. It is made by mixing ⅓ to 6 percent by weight of lecithin with a protein-containing starting material to obtain an intermediate mixture, which is then mixed with 25 to 30 percent by weight of honey to obtain the product. The food concentrate powder contains 30 to 50 percent by weight soy isolate and an animal-protein-containing material, preferably a milk powder. During mixing in of the honey the temperature is preferably kept below 40° C. to avoid denaturing proteins. A method of treating a diabetic to reduce blood sugar level includes daily administration of an effective amount of the food concentrate powder. The product is also useful for reducing fat tissue and for treating amino acid deficiency illnesses.

20 Claims, No Drawings

METHOD FOR PRODUCING AN EASILY DIGESTIBLE PROTEIN CONCENTRATE, A PROTEIN-RICH FOOD ITEM AND ITS USE

BACKGROUND OF THE INVENTION

The invention is directed to a method for producing an easily digestible protein concentrate, a protein-rich food obtainable by means of the method, and use thereof.

Human beings require a supply of essential amino acids for a well-balanced metabolism. The body cannot synthesize these amino acids by itself and, therefore, suitable quantities of these amino acids must be taken in by way of balanced nutrition. Nutritional deficiency in one or more of the essential amino acids leads to metabolic disturbances, e.g., hyperlipidemia, diabetes mellitus, etc., and accompanying hypertension. These disturbances are also a cause of diet-related overweight.

SUMMARY OF THE INVENTION

Therefore, in a balanced diet, it must be ensured that the essential amino acids are present in food in sufficient quantities and in correct proportion. This can be achieved, for example, by consuming animal protein such as fish, meat, sausage, cheese, and so forth. It is disadvantageous in this regard that, in addition to the proteins, large quantities of animal fat are also usually absorbed; this is undesirable especially for overweight persons.

Therefore, consumption of vegetable protein has been recommended as an alternative. In this connection, soy and soy products have proven particularly suitable. According to § 14a of the Nutritional Guidelines, soy protein is equated in value to animal protein. However, a disadvantage of soy is that it is hard to digest. It causes flatulence, a feeling of fullness, and discomfort of the stomach and pancreas, as well as eructation. For this reason, it is necessary for soy to be treated before it is consumed in order to make it more digestible. This can be accomplished by boiling, baking or roasting. Because of the sensitivity of amino acids to heat, however, this results in a loss of amino acids.

Another criterion for assessing the value of a food is its bioavailability. This is assessed on the basis of how easily the amino acids can be absorbed by the body; that is, the proteins obtained through food must first be digested. In so doing, they are broken down into smaller fragments which are then resorbed by the body. The ability of the body to digest the food varies widely between different food items.

As was already mentioned, unprocessed soy is very difficult to digest. For this reason, it has been attempted to make soy more digestible by mixing it with honey. Mixing with honey is suggested in DE 28 53 194. The mixture is allowed to stand, while an increase in the volume of the starting material is observed. The product that is obtained in this way is powdery to granular and can be used directly as a food or can be further processed by adding flavoring, dyes, and so on. The proposed method is disadvantageous in that it can only be carried out with small quantities of soy products (up to about 1 kg). With larger quantities, mixing of the components is impossible because the substance forms tough lumps. Numerous attempts have been made with a variety of mixers, but no successful results were obtained. Attempts to mix soy powder and honey in a drying tower have also failed. A hard candy-like substance is deposited on the inside wall of the tower and can only be removed with great difficulty. This substance had a honey proportion of more than 40% and corresponded to around 30% of the amount of starting products used. The residual product contained a honey proportion of only 15%. The soy isolate used was merely coated with a sugary substance. An intimate mixing of soy isolate and honey, as is described in DE 28 53 194, could not be achieved. The digestibility of the obtained product was not satisfactory. Also, the mixing times and drying times were very long, which eliminated the method from industrial application because of the high costs entailed.

The addition of honey for preserving foodstuffs is known, for example, from DE 30 49 380. It is suggested therein that bee products such as flower pollen, bee bread, propolis or honey are mixed homogeneously with concentrates of milk, whey or other byproducts of the dairy industry, evaporated, dried and, where appropriate,comminuted. The therapeutic effects of the bee products are prominent in the products obtained in this way. Therefore, they have a high proportion of carbohydrates. The amino acid proportion is under 20%, so that the preparations are unsuitable as a protein-containing food concentrate.

Similar considerations apply to a food concentrate described in DE 32 07 505. In order to produce it, honey or honey mixed with other bee products is mixed with a high-value albumin product, minerals and possibly dietary fiber and/or carbohydrates in such a way that the end product contains at least 40 percent-by-weight honey. Examples of high-value albumin products are milk albumins, milk globulins, the residue from ultrafiltration of milk, blood serum albumins and blood serum globulins from freshly slaughtered livestock, egg white, fresh whole eggs, freeze-dried or spray-dried ovoalbumin, ovoglobulin and ovovitellin, yeast extract, meat juice and fish juice. The proportion of carbohydrates is also very high in these preparations. Therefore, additional nutrients with high calorific value are absorbed when albumin is supplied. This is undesirable when the preparation is consumed as a nutritional supplement, for example, in the case of a weight-reducing diet.

A honey-containing food concentrate is likewise suggested in PCTNVO 95/29252. However, the product is heated to over 80° C. during production, so that a considerable proportion of amino acids is deactivated.

Therefore, it is the object of the invention to provide a method for the production of an easily digestible protein concentrate and a protein-rich food concentrate which can be obtained by means of this method, is easy to produce and process in industrial quantities and has a high biological availability.

To meet this object, a method comprising the following steps is suggested:

saturating a protein-rich starting product with an emulsifier;

stirring honey into the saturated protein-rich starting product.

Surprisingly, it has been shown that no lumps are formed when mixing the saturated protein-rich starting product. A fine powder is obtained which can be immediately packed as food or which can easily be processed to make other products. The starting components mix intimately together within a short time. This also enables a fast reaction to its ingredients. The temperature and volume of the mixture increase during the mixing. It appears to undergo a fermentation process in which the proteins of the starting product are broken down and are therefore more easily digestible. Surprisingly, considerable proportions of free amino acids and short-chain peptides were detected in the food concentrate.

Lecithins have turned out to be suitable emulsifiers. Lecithins have already been used for a long time in the food industry. Therefore, there exist no reservations with respect to physiological effect, in particular with respect to their ability to be broken down during digestion. Further, lecithins are obtained from biological sources, e.g., soy or egg yoke. The food is accordingly produced only from materials of biological origin. Addition of stabilizers or preservatives is not required.

In order to keep the proportion of fat and carbohydrate low, it has proven advantageous when the protein-rich starting product is of vegetable origin, and is preferably a soy or soy product. Soy has a very high protein content which can be equated to animal albumin with respect to biological value. A preparation is obtained whose high biological efficacy was proven in different medical tests. The digestion problems normally observed after consumption of raw soy products do not occur.

However, the protein-rich starting product can also be of animal origin and is preferably milk or a milk product. In this case, the food concentrate also advantageously contains a multitude of vitamins and minerals which are contained in the animal starting products. Dry powdered milk is suitable, for example. However, other powders of animal origin produced, for example, from meat byproducts, can also be used.

The best results are achieved when the vegetable starting product and animal starting product are mixed in the protein-rich starting material. The biological value of the albumin can be increased considerably and is then appreciably greater than that of hen's egg white.

The protein-rich starting material and honey are mixed especially intimately when the honey is liquid and is added in a very fine stream, preferably from a plurality of nozzles, particularly without pressure. The mixing times can therefore be advantageously reduced, which also leads to a reduction in production costs for the food concentrate. The nozzles can be provided, for example, in the cover of the mixer.

It is also possible to add the honey as an aqueous solution. The degree of dilution is selected as a function of the moisture content desired in the final product.

A careful handling of the proteins contained in the starting material is ensured when a temperature of 60° C. is not exceeded while the honey is stirred in; the stirring in is preferably carried out at room temperature. There is no risk of a denaturation of the proteins within the claimed temperature range. In particular, the essential amino acids are not deactivated.

During the mixing of the protein-rich starting material and honey, a temperature increase as well as a volume increase are observed in the mixture. Therefore, it is favorable when the mixture is allowed to stand for several hours, preferably overnight, after stirring to allow the reactions of the ingredients to be carried out as completely as possible. The moisture content of the mixture decreases already during the mixing as well as during the subsequent standing period. It has proven advisable to let the mixture stand until a moisture content of preferably 1 to 8%, particularly 2 to 5%, is reached. Also, problems occurring as a result of the increase in volume after the food concentrate is packed can be avoided in this way. Otherwise, the packaging can bulge or even explode under certain circumstances. The food advantageously has a moisture content of less than 5% when packed.

A protein-rich food which is particularly easy to digest is obtained when the honey is added in a proportion of 10 to 40%, preferably 25 to 30%, in relation to the weight of the final product. Consequently, the food has a high proportion of amino acids, while the proportion of carbohydrates is kept low. At the same time, a sufficient breaking down of the proteins is achieved with the above-indicated proportion of honey.

The mixing of protein-rich starting material and honey is easily accomplished when the quantity of lecithin added is 1 to 6%, preferably 2 to 4%, in relation to the total amount. The obtained food concentrate is then advantageously also soluble in beverages, for example, tea or coffee.

The protein-rich food concentrate has a pleasant taste and is suitable for consumption without further processing. However, it can also be processed to form other products by adding minerals, flavoring, vitamins and conventional food additives to the protein-rich food concentrate.

With the process according to the invention, a food concentrate can be obtained which has especially advantageous properties. It has all amino acids, including the essential amino acids, and is easily digestible. The amino acids can easily be resorbed by the body. It is particularly advantageous that the food concentrate has an albumin proportion of at least 50% in relation to total weight; that is, it possesses high biological efficacy as a supplement, for example, to treat amino acid deficiency symptoms. Since at least 40% of the albumin is in the form of free amino acids or short-chain peptides, the food concentrate can be digested very easily because the proteins need not be split first by the body's enzymes. Consequently, digestion problems do not occur. Because of the balanced supply of all amino acids, metabolism proceeds uniformly. Disturbances in albumin transfer caused, for example, by overweight are cured. Therefore, the food concentrate is ideally suited as a food supplement for eight-reducing therapies, convalescence following illness or surgery, as a general strengthener, e.g., for athletes.

The food concentrate is especially suited as a dietetic food item, especially for treatment of amino acid deficiency illnesses.

The invention will be described in a preferred embodiment form with reference to embodiment examples, additional advantageous details being indicated in the examples.

1. GENERAL DIRECTIONS

A mixture of 30 to 50% by weight of soy isolate (protein proportion 60 to 90%) is intimately mixed in a premixer, known per se, with 25 to 45% by weight of animal protein as well as vitamins, minerals and, when needed, other additives. The animal protein should be in powder form if possible. Starting materials with a high moisture content, e.g., sour skimmed milk, must be dried beforehand by pressing, etc. The obtained protein mixture is subsequently sprayed in a conventional installation with a lecithin solution (3 to 8% of total quantity) and intensively mixed. In a mixer having a plurality of nozzles depending upon size, a fine stream of raw honey is added without pressure to the saturated mixture obtained in this way. By raw honey is meant a honey that is used without further processing as immediately as possible after spinning for producing the food concentrate. This ensures the highest possible activity of the enzymes contained in the honey. The added quantity of honey corresponds to approximately 25 to 30% by weight of the total amount. During the addition, the mixture heats up appreciably. Also, at low room temperatures, a rise in temperature of up to 40° C. is observed. At the same time, the volume of the mixture increases. After the mixing process, a pourable powder is obtained. There are no lumps and it can either be packaged immediately or processed to make other products.

2. PRODUCTION EXAMPLE a) Production of Protein Mixture:

In a premixer, 290 kg of soy isolate (Sojasolat) and 158 kg of buttermilk powder are mixed and sprayed with 2 kg of lecithin oil accompanied by further mixing.

b) Production of the Food Concentrate:

450 kg of the protein mixture obtained in a) are placed in a swirling mixer with a capacity of 800 kg, wherein 15 nozzles are arranged so as to be uniformly distributed in its upper inner side. Subsequently, 150 kg of liquid raw honey is added in a fine stream without pressure accompanied by intensive mixing within a period of 10 minutes. The temperature in the mixture increases to about 39° C. At the same time, an increase in the volume of the mixer contents of about 23% is observed. After the honey has been added, the mixing continues for another 5 minutes. A yellowish powder with a slightly nutty flavor with a moisture content of about 7% is obtained. The yield is practically quantitative.

The grain size distribution of the powder is shown in Table 1. The grain size distribution is uniformly fine. The proportion of grains greater in size than 1.0 mm is low at 3.8%. The formation of larger lumps was not observed. The powder can be removed from the mixer without difficulty.

TABLE 1

Grain size distribution of the food concentrate

| mm | % |
| --- | --- |
| >1.0 | 3.8 |
| >0.5 | 12.2 |
| >0.25 | 26.0 |
| >0.09 | 20.2 |
| >0.063 | 11.4 |
| <0.063 | 26.4 |

The heating observed during mixing does not result in destruction of essential amino acids. The values obtained in determining the amino acids in the food concentrate are compiled in Table 2.

TABLE 2

Amino acid content of the food concentrate

| amino acids | g/100 g |
| --- | --- |
| alanine | 1.9 |
| arginine | 3.8 |
| aspartic acid | 6.1 |
| cysteine | 3.5 |
| glutamic acid | 10.6 |
| glycine | 2.9 |
| histidine | 1.1 |
| isoleucine | 1.2 |
| leucine | 4.7 |
| lysin | 3.1 |
| methionine | 2.1 |
| phenylanaline | 3.1 |
| proline | 2.6 |
| serine | 5.7 |
| threonine | 2.3 |
| tryptophan | 0.30 |
| tyrosine | 2.7 |
| valine | 2.4 |

The powder can be packaged immediately at the conclusion of the mixing process. In so doing, however, the container should only be filled to 75% of its capacity because the volume increase of the protein-rich food concentrate progresses after some time. When stored in gastight cans, the moisture content of the concentrate decreases to about 2% over the course of time.

2. BIOLOGICAL ACTIVITY

Example 1

The food concentrate obtained in Production Example 2 was administered at 10 g/day to each rat in a group of rats over a period of 6 weeks. In addition, the rats had unrestricted access to the usual dry food. A control group received only the usual dry food.

The animals were killed and tissue sections were examined under an electron microscope at a magnification of 20,000 times. The thickness of the fatty layer surrounding the cells was clearly thinner in the animals treated with the food concentrate compared with the control group. The food concentrate had a positive effect on the metabolism of the treated animals.

Example 2

A group of 33 diabetics, all of whom were overweight, were given the food concentrate according to Production Example 2 starting with a dosage of one teaspoon per day. The dosage was gradually increased to 60 grams per day and each dose was taken 15 minutes before meals. A significant reduction in the blood sugar level was achieved in all of the test subjects. Moreover, even with difficult patients, a stabilization of the blood sugar level was observed. The test persons stated that the ability to concentrate also increased. Digestion problems normally occurring when raw soy products are consumed were not observed.

Example 3

A group of 5 jumper horses and 6 dressage horses were given the food concentrate according to Production Example 2 in addition to their usual fodder in a dosage of 5 to 6 tablespoons per day for a period of 6 months.

Over the course of the tournament season, the animals showed a clear increase in resistance to stress and in ability to concentrate. The constitution of the musculature remained uniformly favorable over the course of the season. Also, the swelling in the legs or increased bile flow normally occurring when protein-rich food is given was not observed.

What is claimed is:

1. An easily digested dietetic food concentrate powder consisting of:

from 30 to 50 percent by weight of a soy isolate, said soy isolate containing from 60 to 90 percent by weight, based on a total amount of said soy isolate, of soy proteins;

from 25 to 45 percent by weight of a milk product, said milk product comprising albumin;

from ⅓ to 6 percent by weight of lecithin;

from 25 to 30 percent by weight of honey; and from 1 to 8% by weight of water.

2. The dietetic food concentrate powder as defined in claim 1, wherein said milk product is buttermilk powder.

3. The dietetic food concentrate powder as defined in claim 1, wherein said honey is raw honey for food concentrate compositions and said raw honey has not been processed further after spinning so as to have the highest possible enzyme activity.

4. The dietetic food concentrate powder as defined in claim 1, wherein no more than 3.8 percent by weight of the food concentrate powder has a grain size greater than 1 mm.

5. The dietetic food concentrate powder as defined in claim 1, made by a process comprising mixing said soy isolate and said milk product together to form a protein-containing starting mixture, then mixing the lecithin with the protein-containing starting mixture to obtain an intermediate mixture and finally mixing the honey with the intermediate mixture while simultaneously keeping a temperature of the intermediate mixture less than 40° C. during the mixing of the honey with the intermediate mixture.

6. An easily digested dietetic food concentrate powder comprising:
   from 30 to 50 percent by weight of a soy isolate, said soy isolate containing from 60 to 90 percent by weight, based on a total amount of said soy isolate, of soy proteins;
   an amount of an animal-protein-containing material comprising albumin;
   from ⅓ to 6 percent by weight of lecithin acting as emulsifier;
   from 25 to 30 percent by weight of honey; and
   from 1 to 8% by weight of water;
   wherein said amount of said animal-protein-containing material and a proportion of said albumin in said animal-protein-containing material are both large enough so that the food concentrate powder contains at least 50% by weight of said albumin.

7. The dietetic food concentrate powder as defined in claim 6, wherein said animal-protein-containing material is a milk powder.

8. The dietetic food concentrate powder as defined in claim 7, wherein said milk powder is buttermilk powder.

9. The dietetic food concentrate powder as defined in claim 6, wherein no more than 3.8 percent by weight of the food concentrate powder has a grain size greater than 1 mm.

10. The dietetic food concentrate powder as defined in claim 6, made by a process comprising mixing said soy isolate and said animal-protein-containing material together to form a protein-containing starting mixture, then mixing the lecithin with the protein-containing starting mixture to obtain an intermediate mixture and finally mixing the honey with the intermediate mixture while simultaneously keeping a temperature of the intermediate mixture less than 40° C. during the mixing of the honey with the intermediate mixture.

11. The dietetic food concentrate powder as defined in claim 6, further comprising at least one additive ingredient selected from the group comprising vitamins and minerals.

12. A method of treating an amino acid deficiency illness of a person or animal, said method comprising the steps of:
   a) providing a dietetic food concentrate comprising from 30 to 50 percent by weight of a soy isolate, said soy isolate containing from 60 to 90 percent by weight, based on a total amount of said soy isolate, of soy proteins; from 25 to 45 percent by weight of a milk product, said milk product containing albumin; from ⅓ to 6 percent by weight of lecithin acting as emulsifier; from 25 to 30 percent by weight of honey; and from 1 to 8% by weight of water; and
   b) administering an effective amount of said dietetic food concentrate to treat said amino acid deficiency illness of said person or animal.

13. A method of treating a diabetic person to reduce blood sugar level in said diabetic person, said method comprising the steps of:
   a) providing a dietetic food concentrate comprising from 30 to 50 percent by weight of a soy isolate, said soy isolate containing from 60 to 90 percent by weight, based on a total amount of said soy isolate, of soy proteins; from 25 to 45 percent by weight of a milk powder, said milk powder containing albumin; from ⅓ to 6 percent by weight of lecithin; from 25 to 30 percent by weight of honey; and from 1 to 8% by weight of water; and
   b) administering a daily dosage of a predetermined amount of said dietetic food concentrate to said diabetic person, said predetermined amount of said dietetic food concentrate consisting of one teaspoon full of said concentrate on a first day during which said concentrate is administered and increasing to 60 grams per day on a subsequent day on which said concentrate is administered;
   whereby said blood sugar level of said diabetic person is decreased and a concentration ability of said diabetic person is increased, without causing digestive problems.

14. The method as defined in claim 13, wherein said dietetic food concentrate is administered 15 minutes prior to eating.

15. A method of reducing fatty tissue of an animal or human, said method comprising the steps of:
   a) providing a dietetic food concentrate comprising from 30 to 50 percent by weight of a soy isolate, said soy isolate containing from 60 to 90 percent by weight, based on a total amount of said soy isolate, of soy proteins; from 25 to 45 percent by weight of a milk product, said milk product containing albumin; from ⅓ to 6 percent by weight of lecithin acting as emulsifier; from 25 to 30 percent by weight of honey; and from 1 to 8% by weight of water; and
   b) administering an effective amount of said dietetic food concentrate to said animal or human on a daily basis;
   whereby said fatty tissue of said animal or human is reduced without digestive problems.

16. A process for making a digestible dietetic food concentrate, said process comprising the steps of:
   a) providing a protein-rich starting material comprising an animal-protein-containing material and from 30 to 50 percent by weight, based on a total amount of said food concentrate, of a soy isolate, wherein said animal-protein-containing material comprises albumin, and wherein said soy isolate contains from 60 to 90 percent by weight, based on a total amount of said soy isolate, of soy proteins;
   b) mixing said protein-rich starting material with from ⅓ to 6 percent by weight, based on a total amount of said food concentrate, of lecithin as an emulsifier for said protein-rich starting material to obtain an intermediate mixture;
   c) mixing the intermediate mixture with from 10 to 40 percent by weight of honey, based on a total amount of said food concentrate, while maintaining a temperature of said intermediate mixture less than 60° C., to obtain said food concentrate;
   whereby said food concentrate contains at least 50 percent by weight of said albumin, based on a total amount of said food concentrate.

17. The process as defined in claim 16, wherein said animal-protein-containing material is a milk powder or a milk product.

18. The process as defined in claim 16, wherein said animal-protein-containing material is buttermilk powder and said food concentrate is a powder in which no more than 3.8 percent by weight of the powder has a grain size greater than 1 mm.

19. The process as defined in claim 16, further comprising providing at least one food additive selected from the group consisting of vitamins and minerals in said intermediate mixture.

20. A digestible dietetic food product made by said process of claim 16 or 19.

* * * * *